(12) United States Patent  (10) Patent No.: US 7,110,801 B2
Nassimi  (45) Date of Patent: Sep. 19, 2006

(54) VOICE ACTIVATED WIRELESS PHONE HEADSET

(76) Inventor: Shary Nassimi, 5913-C NE. 127 Ave., Suite 800, Vancouver, WA (US) 98682

( * ) Notice: Subject to any disclaimer, the term of this patent is extended or adjusted under 35 U.S.C. 154(b) by 360 days.

(21) Appl. No.: 10/687,945

(22) Filed: Oct. 17, 2003

(65) Prior Publication Data

US 2004/0137969 A1  Jul. 15, 2004

Related U.S. Application Data

(62) Division of application No. 10/143,136, filed on May 9, 2002.

(51) Int. Cl.
*H04B 7/00* (2006.01)
*H04B 17/00* (2006.01)
*H04B 1/38* (2006.01)
*H04M 1/00* (2006.01)

(52) U.S. Cl. ............... 455/575.2; 455/41.2; 455/67.11; 455/67.13; 455/563; 455/569.1

(58) Field of Classification Search ...... 455/41.1–41.3, 455/63.1, 66.1, 67.11, 67.13, 68.79, 401, 455/550.1, 556.1, 557, 563, 567, 570, 569.1, 455/569.2, 575.2; 379/207.07, 207.1, 252, 379/428.02, 392.01, 416, 406.01, 406.03; 381/370, 376, 110, 182, 123, 74
See application file for complete search history.

(56) References Cited

U.S. PATENT DOCUMENTS 4,484,036 A * 11/1984 Lyle et al. ................... 379/351
4,939,775 A * 7/1990 Houck et al. .......... 379/373.01
5,280,524 A    1/1994 Norris
5,608,794 A    3/1997 Larson
5,844,992 A * 12/1998 Boyer ......................... 381/57
5,867,574 A *  2/1999 Eryilmaz ............... 379/388.04
6,233,462 B1*  5/2001 Kanai ......................... 455/550
6,349,222 B1   2/2002 Hafiz
6,459,911 B1  10/2002 Hijii
6,473,630 B1* 10/2002 Baranowski et al. ........ 455/572
6,826,515 B1* 11/2004 Bernardi et al. ............ 702/191
6,928,306 B1*  8/2005 Matsuda et al. ............ 455/567
2002/0141571 A1 10/2002 Larsen et al.
2003/0017859 A1*  1/2003 Martinez et al. ............ 455/567
2003/0045235 A1*  3/2003 Mooney et al. ............... 455/41

* cited by examiner

*Primary Examiner*—Charles N Appiah
*Assistant Examiner*—Meless Zewdu
(74) *Attorney, Agent, or Firm*—George R. McGuire; Bond, Schoeneck & King, PLLC (57) ABSTRACT

A voice activated wireless phone headset whereby power control, timer and noise level recognition circuits sample ambient noise/voice levels and at predetermined levels provide an "off-hook" telephone condition. The light weight headset fastens around the ear with an adjustable microphone tube that extends towards the user's mouth thus emphasizing vocal noises. The headset will, on receiving a ring signal, begin measuring a pre-selected length of time. If the voice level of the user increases above a threshold level, the headset unit will then send an activation signal to the base unit causing an "off-hook" condition and allowing a phone conversation. A wireless connection to a base unit exists. Bandpass filters, levels, digital signal processing and other methods allow more efficient voice and/or word recognition.

6 Claims, 9 Drawing Sheets

VOICE ACTIVATED WIRELESS PHONE HEADSET

CROSS REFERENCE TO RELATED APPLICATION

This divisional application claims the benefit and priority of co-pending U.S. Pat. application Ser. No. 10/143,136 filed May 9, 2002 and entitled IMPROVED WIRELESS HEADSET, in the name of the same inventor Shary Nassimi.

FIELD OF THE INVENTION

This invention relates generally to telephony, but specifically to wireless headsets for use with a base unit and telephone.

STATEMENT REGARDING FEDERALLY FUNDED RESEARCH

This invention was not made under contract with an agency of the US Government, nor by any agency of the US Government.

BACKGROUND OF THE INVENTION

Telephones, while convenient, require the user to use one hand to hold the telephone in proximity to ear and mouth in order to use the telephone. In addition, when the user wishes to use a cell phone control such as the alphanumeric keypad, the user must take the cell phone from their ear and transfer it to a location in which they can see the keypad and push buttons as needed. In addition to inconvenience and distraction from contraindicated activities such as driving, this is a two handed process. These problems are not restricted to telephones as a growing number of types of devices offer users audio input and output data. Personal computers and personal digital assistants, as two examples, offer increasingly efficient speech recognition. Digital and tape recorders, which do not offer voice recognition, are also examples of the types of devices which may increasingly be voice activated and may even offer preprogrammed voice output.

The requirement of holding a device such as a cell telephone to the ear in turn causes various other problems, safe operation of motor vehicles being one major example of such issues, tiredness by the user's arm being a less important type of problem. For these reasons and others, vendors and inventors are offering a range of solutions to the problem of "hands free" cell phone operation.

One attempt to solve this problem is the "hands free cell phone" or speaker phone in which the volume of the audio output and the sensitivity of the audio input are dramatically increased. The user places the cell phone or other device in a special holder or merely places it on seat or dashboard and speaks loudly. Such systems have numerous disadvantages: audio feedback, ambient interference and poor sound quality, among others. Lack of privacy is increasingly an issue as well, since both sides of the conversation are clearly audible to anyone nearby.

One more promising route for improvement is the use of the headset. By wearing earphones and a microphone, a user can escape the need to continuously hold the cellular telephone or other audio input/output device. Unfortunately, headset cords connecting the headset to the base device can entangle the user's hands, arms, or whatever they may be using, such as a computer keyboard or steering wheel, thus posing a threat on their own. The solution to this problem is the wireless headset, in which the headset device and base device communicate by means of RF transmissions.

Wireless headsets offer a potentially life saving hands free mode of operation for motor vehicles and other activities which require continuous active use of two hands. In addition, wireless headsets offer enormous convenience to the office worker. The user wears the wireless headset with microphone and speakers, leaves the base unit safely tucked away, and is in no danger of having one or more hands entangled in a cord or used to control the base device. This life saving ability is of increasing importance as the number of cell telephones on the road proliferates and drivers increasingly ignore safety (and in some jurisdictions the law) in order to use their telephone, computer, recorder or other device. Other situations than driving may also show the life saving features of the present invention: skiing, bicycling, operation of industrial machinery, printing presses, civil engineering equipment, operation of typewriters and word processors and the full range off office equipment.

Various wireless headsets schemes have been proposed. In general, the problem with most headsets is size, bulk, and lack of ease of use. One possible method of shrinking the headset is to minimize the size of controls which must be finger operated.

US Patent Application Publication 2002/0141571 published Oct. 3, 2002 in the name of Larsen et al for HEADSET is one such item: a headset with voice control of transmission and reception amplification. However, this is intended to prevent reception of background noise when the user is not speaking, and to prevent painfully high volumes in the user's ear. It is not related to answering the telephone by voice control.

U.S. Pat. No. 6,459,911 granted Oct. 1, 2002 to Hijii for PORTABLE TELEPHONE EQUIPMENT AND CONTROL METHOD THEREFOR teaches the use of voice recognition to originate a telephone call from a cell phone. However, this device actually teaches the use of a push button to answer the telephone, rather than voice activation or voice recognition to provide an off-hook condition. It also uses a wired microphone rather than a wireless headset.

U.S. Pat. No. 6,349,222 issued Feb. 19, 2002 to Hafiz for VOICE ACTIVATED MOBILE TELEPHONE CALL ANSWERER teaches control of a cell phone without a headset by means of voice recognition of voice spectrum characteristics. Numerous voice recognition and speaker phone patents teach away from the use of a wireless headset by arguing the benefits of voice recognition instead. Another example of this U.S. Pat. No. 5,867,574 issued Feb. 2, 1999 to Eryilmaz for VOICE ACTIVITY DETECTION SYSTEM AND METHOD teaches a method for voice activation in a speaker phone.

U.S. Pat. No. 5,608,794 issued Mar. 4, 1997 to Larson for TELEPHONE HEADSET IN-USE INDICATOR simply indicates the off-hook status of a headset, so that those seeing the user speaking will know that the user is talking to someone on the telephone.

U.S. Pat. No. 5,280,524 issued Jan. 18, 1994 to Norris for BONE CONDUCTION EAR MICROPHONE AND METHOD teaches a wired microphone using bone conduction and voice recognition for control of microprocessor systems. It is wired, and uses voice recognition of commands, not voice activation for answering a telephone.

The disadvantage of voice recognition is the complexity and the dubious accuracy of the method. Complexity requires larger CPU's to handle the load, while lack of accuracy involves offering some manual backup.

It would be advantageous to provide a headset for use with a telephone, which headset offered the ability to voice activate in order to answer the telephone, yet avoided the complexity of voice recognition, and thus allowed a "buttonless" headset of diminished size, weight, cost and complexity.

SUMMARY OF THE INVENTION

General Summary

The present invention teaches a wireless headset having a voice activation feature allowing the telephone to be answered vocally. After receiving a telephone ring signal, the unit activates a timer circuit. If an elevated level of user speech is detected during this time, the base unit activates the telephone line to an off-hook condition. The unit may use filtering of noise so as to better distinguish vocal range noise from background noise. It may also use digital signal processing to distinguish background or normal speech levels of the user from an elevated level used by the user to indicate that the telephone call is to be answered.

The voice activated wireless phone headset has power control, timer and noise level recognition circuits sample ambient noise/voice levels and at predetermined levels provide an "off-hook" telephone condition. The light weight headset fastens around the ear with an adjustable microphone tube that extends towards the user's mouth, thus emphasizing vocal noises. The headset will, on receiving a ring signal, begin measuring a pre-selected length of time. If the voice level of the user increases above a threshold level, the headset unit will then send an activation signal to the base unit causing an "off-hook" condition and allowing a phone conversation. A wireless connection to a base unit exists. Bandpass filters, levels, digital signal processing and other methods allow more efficient voice and/or word recognition.

These functions may be carried out by the headset unit, by the base unit, or by a combination of the two units.

Summary in Reference to Claims

It is another aspect, advantage, embodiment and objective of the present invention to provide a wireless headset device capable of noise level recognition: a timer circuit which activates, for a first length of time, after the phone rings; means for recognizing noise levels above a background environment sound level during the first length of time; and means for activating the headset after recognizing noise levels above a background environment sound level.

It is another aspect, advantage, embodiment and objective of the present invention to provide a wireless headset device for connection to a telephone comprising: a timer circuit for a predetermined length of time, the timer circuit activated by detection of a ring signal on such phone; and a voice level detection circuit capable of activating the headset if an elevated voice level is detected during the predetermined length of time.

It is another aspect, advantage, embodiment and objective of the present invention to provide a wireless headset device for connection to a telephone comprising: a noise level recognition circuit operatively able to activate the headset; the noise level recognition circuit distinguishing voice levels below a first level decibel level as an ambient noise level; the noise level recognition circuit distinguishing voice levels above a second decibel level as the activating noise level; wherein the noise level recognition circuit initiating off-hook operation of such telephone if the activating noise level is detected during a second length of time.

It is another aspect, advantage, embodiment and objective of the present invention to provide a wireless headset device further comprising a timer circuit, the timer circuit measuring the second length of time.

It is another aspect, advantage, embodiment and objective of the present invention to provide a wireless headset device further comprising an adjustable decibel setting device for setting variable ambient noise levels.

It is another aspect, advantage, embodiment and objective of the present invention to provide a wireless headset device further comprising an adjustable decibel setting device for setting activating noise levels.

It is another aspect, advantage, embodiment and objective of the present invention to provide a wireless headset device further comprising a fuzzy logic circuit which samples the background noise level to determine the ambient noise level.

It is another aspect, advantage, embodiment and objective of the present invention to provide a wireless headset device further wherein the second time period is 5 seconds.

INDEX TO REFERENCE NUMERALS

Ref. 2 Headset
Ref. 4 Transceiver
Ref. 6 Connections
Ref. 8 Base unit
Ref. 10 Sound waves
Ref. 12 Clip
Ref. 14 Earpiece speaker
Ref. 16 Body
Ref. 18 Microphone tube
Ref. 100 Base Unit 100
Ref. 102 Connection
Ref. 104 Base transceiver unit
Ref. 106 Interface and Impedance Matching
Ref. 108 Preamp
Ref. 110 External Power
Ref. 112 Power Supply
Ref. 114 Battery
Ref 120 Power Control Circuit
Ref. 122 Transmitter
Ref. 124 Receiver
Ref. 200 Headset
Ref 208 Preamp Ref. 212 Power Supply
Ref. 214 Battery
Ref. 220 Power Control Timer and Noise Level Recognition Circuit
Ref. 222 Transmitter
Ref. 224 Receiver
Ref. 226 Antenna
Ref. 228 Antenna
Ref. 230 Earpiece Speaker
Ref. 232 Microphone
Ref. 330 Timer Circuit
Ref. 332 Noise Level Recognition Circuit
Ref. 334 Ring Signal
Ref. 336 Noise Level
Ref. 338 Power Control Circuit
Ref. 340 First Control Signal
Ref. 344 Second Control
Ref. 402 Wireless headset
Ref. 408 Upper body of wireless headset
Ref. 410 Lower body of wireless headset
Ref. 412 Circuitry
Ref. 414 Battery
Ref 416 Battery cap
Ref. 418 Speaker housing
Ref. 420 Mini-speaker
Ref. 422 Sound tube

DETAILED DESCRIPTION

Figure 1:
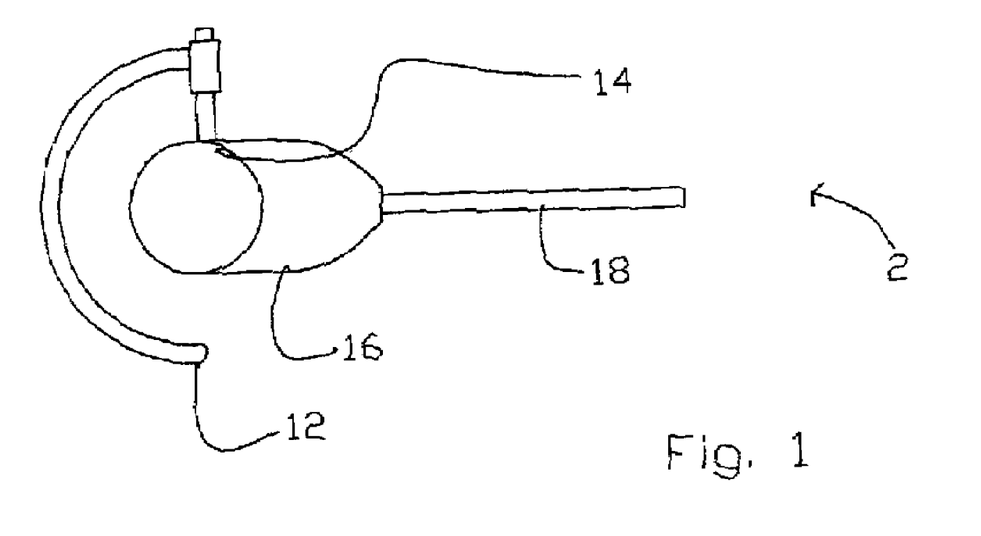
FIG. 1 is a side view of the first embodiment of the improved wireless headset of the invention.

FIG. 1 is a side view of the first embodiment of the voice activated wireless phone headset of invention. Headset 2 has ear clip 12 used to retain headset 2 on an ear. Earpiece speaker 14 fits in or over the user's ear. Body 16 contains the electronic devices used to make the voice activated wireless phone headset in or over the user's ear. Body 16 contains the electronic devices used to make the headset device work properly, while microphone tube 18 may contain a microphone (not shown). The microphone may be located at the base of the microphone tube 18 inside or near to body 16, or in alternative embodiments the microphone may be located at other locations in or on microphone tube 18. While clip 12 is the preferred embodiment and best mode presently contemplated for holding the headset to the user's ear and properly oriented near the user's ear and mouth, other structure such as elastic bands, hair clips, head bands, etc., may be substituted without departing from the scope of the invention. Microphone tube 18 has two ends, one located at body 16, the other located such that when the headset is worn properly, one end of microphone tube 18 is located near the user's mouth.

Microphone tube 18 may also advantageously contain one or more antennae. This allows increased length for each antenna and yet does not increase the overall length of headset 2.

Figure 2:
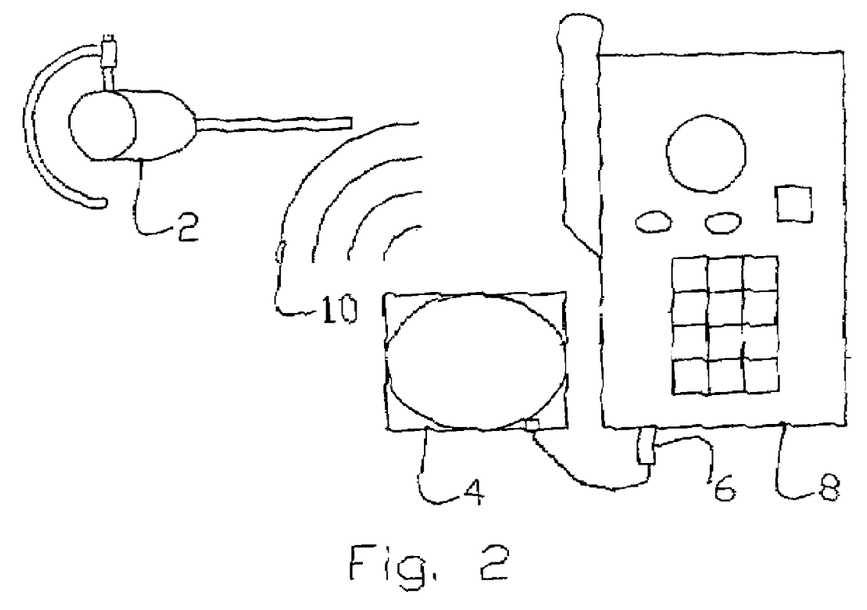
FIG. 2 is a block diagram of a second embodiment of the invention, showing the overall system in use with a cell phone.

FIG. 2 is a block diagram of a second embodiment of the invention, showing the overall system in use with a cell phone. Sound waves 10 reaching headset 2 communicates via 2-way RF link with base transceiver 4. Base transceiver 4 in turn has connections 6 to base unit 8. In the second embodiment, base unit 8 may be a cell phone (as shown in FIG. 2) or may be another type of device. Such devices now include computers (which are increasingly able to input, process, and output, human speech), personal digital assistants, recorders, other consumer electronic devices, and in the future, a wide range of other devices which are not presently known (real-time verbal translators) or which are presently know but which are not presently susceptible to reliable audio input and output (automobiles for handicapped mobility). Such devices, now known or later developed, are included within the possible types of base units useful with the present invention.

Figure 3:
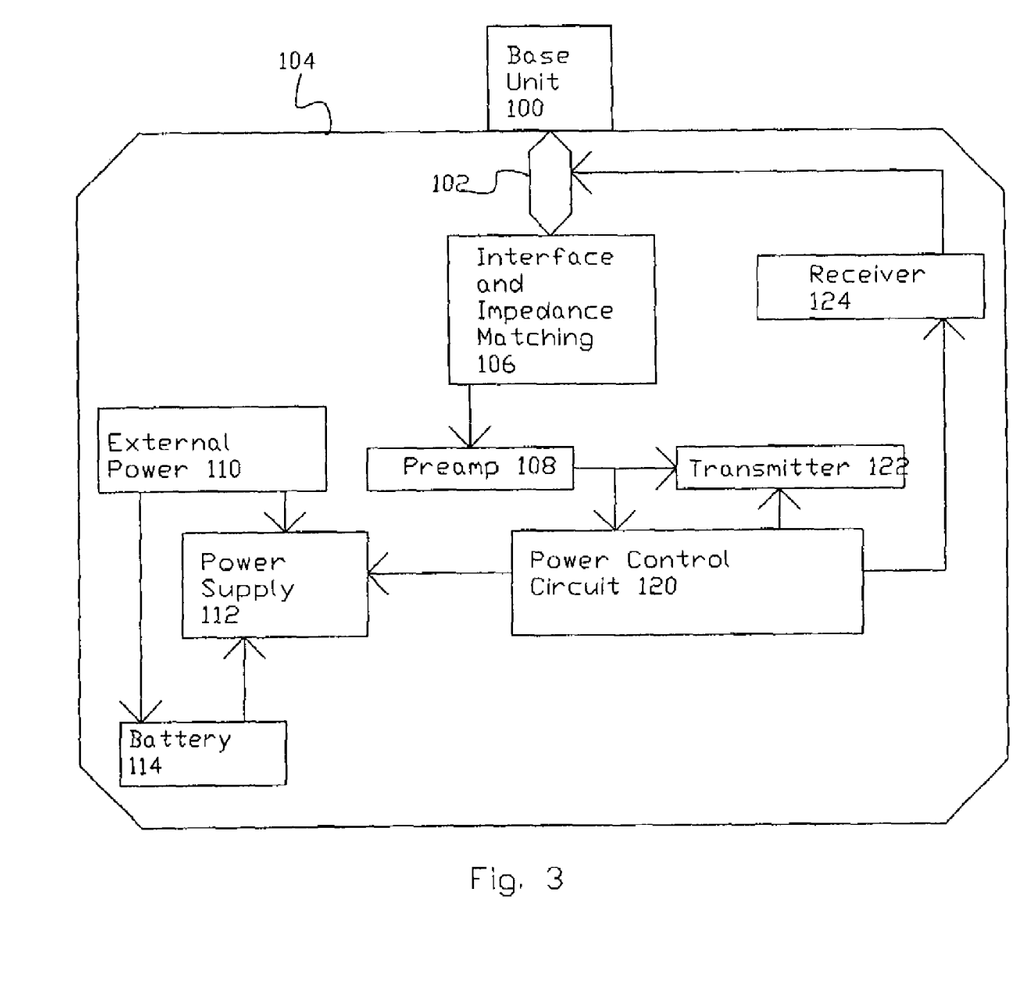
FIG. 3 is a block diagram of a third embodiment of the invention showing details of the base transceiver unit.

FIG. 3 is a block diagram of a third embodiment of the invention showing details of the base transceiver unit. Base unit 100 connects via connection 102 to base transceiver unit 104. Base unit 100 may be any of the devices as discussed previously. Connection 102 may be a cable and 2.5 mm jack, another form of standard jack such as is used in the telecommunication industry (for example, RJ-11 or RJ-35), or another form of standard jack such as is used in the computer industry (IEEE 1394, USB, etc.) or another type of jack. The connection may also be made without a cable/jack structure, for example, base transceiver unit 104 may be integrated into base unit 100, or a non-physical connection may be established, etc.

Interface 106 performs matching of impedance (resistance), protocols, and/or physical matching to the connection means, then sends the signals to be sent to a headset unit (not shown) to preamp 108. It is important to know that base unit interface 106 is able to produce an "off hook" signal indicating that an incoming telephone call is to be answered. After the signal is boosted, filtered, transformed and otherwise handled in preamp 108, transmitter 122 sends an RF signal. An antenna (not shown) may advantageously be used with transmitter 122. Transmitter 122 may use any frequency legally available, for example, in the US, the Federal Communications Commission establishes and regulates use of such frequencies. RF signal 122 may advantageously be a high frequency signal allowing greater bandwidth and thus an increased audio data capacity and greater clarity, broader audio frequency range transmission, etc. RF signal 122 may be full or half duplex, or may be digitally encoded by any method (TDMP, etc).

Receiver 124 sends RF data in the other direction, receiving it from the headset transceiver unit and sending it to the base unit 100. In the embodiment shown, receiver 124 sends the RF data to connection 102 however; receiver 124 may in other alternative embodiments operate through other circuitry such as interface 106 or analogous devices.

Receiver 124 and transmitter 122 may operate independently, may operate in full-duplex mode, etc, thus allowing simultaneous transmission and reception.

External power 110 may be a conventional AC power source at the locally used voltage and frequency (for example 115 VAC @ 60 Hz), or it may be a DC power source (such as 12 volt or 42 volt supplies found in vehicles). External power 110 goes to power supply 112 for any necessary inversion to AC, conversion to DC, etc. For example, in an alternative embodiment in which the circuitry of base transceiver unit 104 operates at 5 volts DC, power supply 112 may convert from 240 VAC to 5 VDC. External power 110 may also be used to recharge battery 114, or in alternative embodiments, power supply 112 may recharge battery 114 using power supplied by external power source 110. Battery 114 may provide power to both power supply 112 and power control circuit 120.

Power control circuit 120 assists in saving energy by controlling the power flow to transmitter 122, receiver 124, power supply 112, and other associated circuitry. Power control circuitry 120 thus saves energy and furthermore increases battery life. Power control circuit 120 may operate automatically to turn on and off transmitter 122 or power supply 112, and may operate to turn on and off or to mute receiver 124.

For example, a user might use the headset of the present invention to carry on a long telephone conversation, thus somewhat draining the battery of the headset unit (not shown). During the course of the conversation, power control circuit 120 may provide automatic volume control as both a convenience and an energy saving mechanism. The user may provide manual volume control by adjusting the volume of the base device. Note that this is different from devices which use voice activated or voice recognition control to control the volume in order provide an energy saving, squelch or hearing protection reason.

The time of turning off of the power supply may be dictated by the charging of the base transceiver battery (not shown), may be automatic based upon time or other factors, may be manual, etc.

Power control circuit 120 may further be operated by signals received from the headset. When an activating signal is received from the headset, power control circuit 120 may activate the base unit.

In the presently preferred embodiment power control circuit 120 activates automatically when a ring signal is received and cause the headset unit speaker to make a ring signal in the ear of the user or in alternative embodiments the base unit may itself make the ring signal. Thereafter, if an appropriate response is received, base unit 100 goes to an off hook condition to afford telephone communication to the user.

Figure 4:
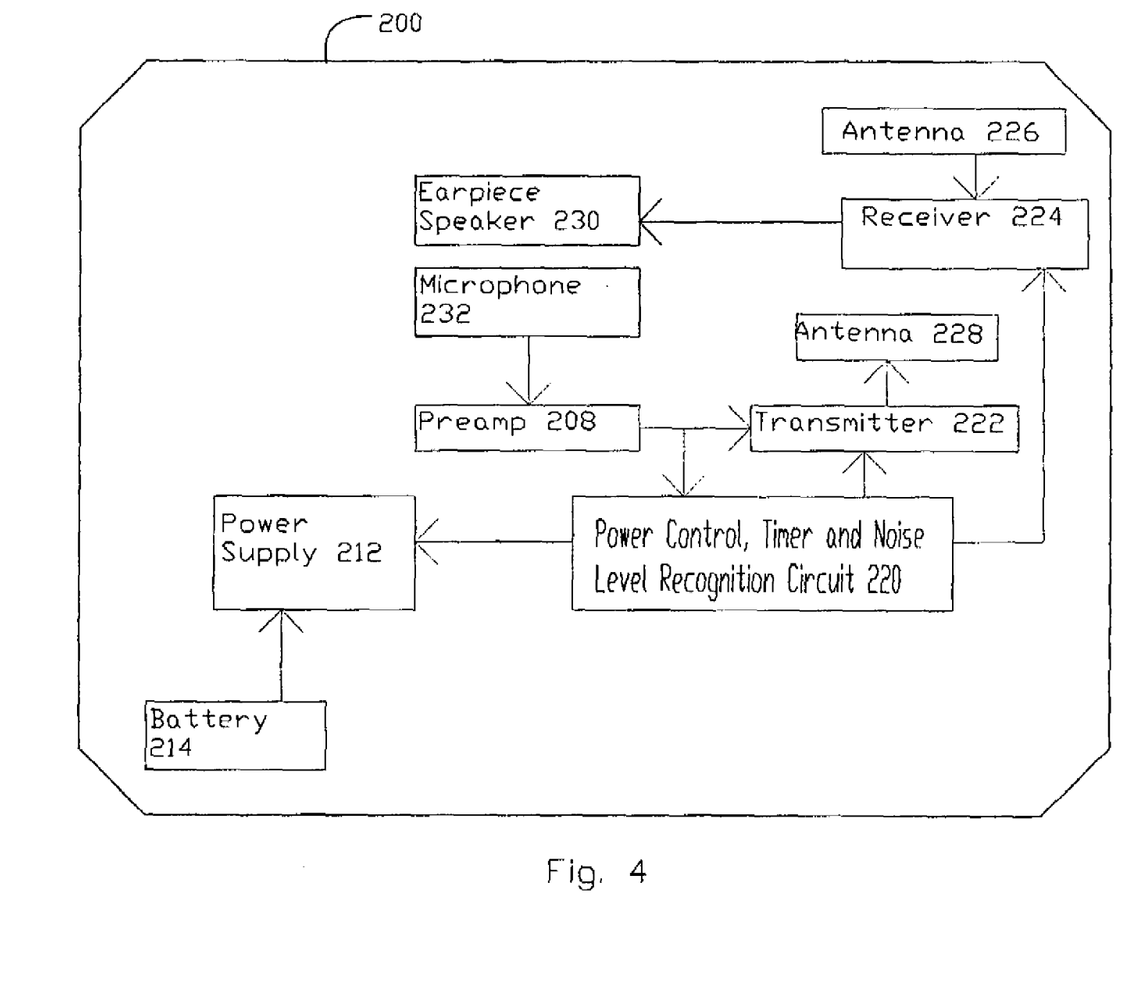
FIG. 4 is a block diagram of the first embodiment of the invention showing details of the headset transceiver unit.

FIG. 4 is a block diagram of the first embodiment of the invention showing details of the headset transceiver unit.

Headset 200 has preamp 208, microphone 232, transmitter 222, earpiece speaker 230, receiver 224 and antennae 226 and 228. These function in a manner analogous to that described above in reference to base transceiver unit 104. Microphone 232 picks up audio signals from the user, converts such audio data to electronic information and transmitter 222 sends the signals to base transceiver unit 104 as radio frequency emissions. Receiver 224 picks up RF emissions from base transceiver unit 104 and sends them to earpiece speaker 230 for conversion to audible format (sound waves) for the user. Antennae 226 and 228 are shown in FIG. 4, however, the two may be combined in alternative embodiments into a single antenna device.

In the presently preferred embodiment and best mode presently contemplated for carrying out the invention, antennae 226 and 228 may be hidden within microphone tube 18 (see FIG. 1). By this method the overall size of headset 200 may be kept small. Antennae 226 and/or 228 may also be located on microphone tube 18. In any case, antenna 226 and 228 may run along a portion or all of the length of microphone tube 18.

Size, weight and cost being important issues in headset design, it is desirable to eliminate as much structure as possible without eliminating the associated functionality. In the presently preferred embodiment and best mode presently contemplated for carrying out the invention, power control, timer and noise level recognition circuit 220 be placed inside a headset. Power control, timer and noise level recognition circuit 220 eliminates the need for a headset mounted volume control, a headset mounted on/off switch and other devices.

During use, power control, timer and noise level recognition circuit 220 and/or receiver 224 may act to automatically control volume of the audio output from earpiece speaker 230. Power control, timer and noise level recognition circuit 220 and/or transmitter 222 may also act to control transmission strength to base transceiver unit 104. By means of this structure, battery life and sound quality may be enhanced, but without the cost and bulk of an external control device such as a knob large enough for manipulation by a user's fingers.

When the user desires manual volume control, the user may accomplish this by adjusting the volume of the base device (such as a cell phone) to which the base transceiver is attached.

Furthermore, power control, timer and noise level recognition circuit 220 may turn on and off receiver 224 and transmitter 222 in a manner similar to that described above in reference to base transceiver unit 104. By this means, battery life may be extended yet without the cost and bulk of an external control device such as a switch of a size suitable for a user's fingers to operate.

Power control, timer and noise level recognition 220 may act independently of base unit power control 120 or may cooperate with base unit power control 120. For example, power control 220 may act to shut down transmitter 222 whenever a user silence is detected, or power control 220 may receive a signal from base unit 104 informing it of the end of a transmission or of the end of a user session such as a single telephone call.

In the preferred embodiment, headset 200 will, on receiving a ring signal, begin measuring a pre-selected length of time. If the voice level of the user increases above a ambient/threshold level, headset unit 200 will then send an activation signal to base unit 100, causing an "off-hook" condition and allowing a phone conversation.

Figure 5:
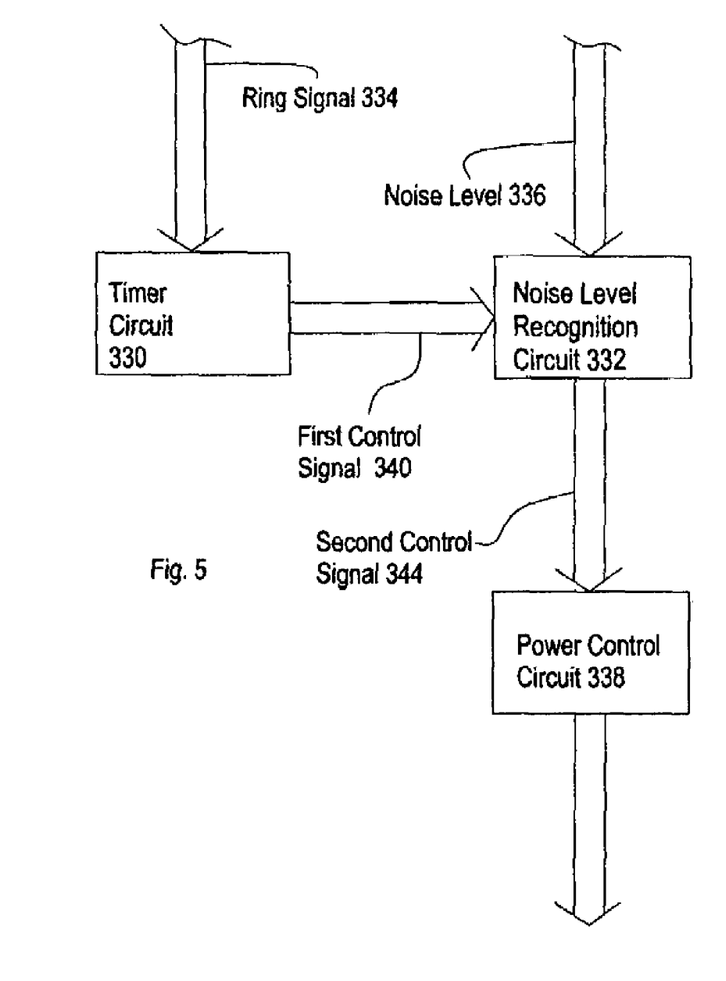
FIG. 5 is a block diagram of the first embodiment of the invention showing details of the noise level recognition circuit and timer.

FIG. 5 is an expanded view of the power control, timer and noise level recognition circuit 220. Timer circuit 330 is activated by detection of a ring signal 334. This is received from the base unit receiver 124 and may also make a ring signal in response to the original ring signal. The timer circuit 330 sends a first control signal 340 to the noise level recognition circuit 332 that detects and deciphers an intensity of noise level 336. The noise level detection circuit 332, detects voice levels, does not respond to ambient voice and noise levels below a first decibel level, and remains inactive until a second threshold noise or voice level that the noise level detection circuit 332 distinguishes to be above the second decibel level and becomes activated thereby engaging the power control circuit 338.

Noise level detection circuit 332 may periodically sample the ambient voice and noise levels to determine the first decibel level, or the first ambient decibel level may be predetermined to adjust for the individual environment in which the voice activated wireless phone headset may reside. Noise level recognition circuit 332 distinguishes voice levels above the predetermined decibel level to activate power control circuit 338. Setting of such noise levels may be accomplished at the base unit or the headset unit.

Note that detection of an elevated voice level must occur within the time interval (such as 5 seconds) after an incoming signal has been detected for the off-hook condition to be achieved. At other times, such as prior to a ring signal or after the expiration of the time interval measured by the timer circuit, an elevated voice level does not cause an off hook phone condition. A voice elevation duration of 300 milliseconds may be used as a threshold time frame for voice activation.

Frequency filtering may be used to aid in distinguishing voice levels from ambient noise. High pass filtering may be used in embodiments, as may low pass. A band pass filter may in some best modes by used.

In the best mode now contemplated, digital signal processing may be used to distinguish voice levels between the first level and the second (threshold) level. Such processing may utilize fuzzy logic as well as frequency spectrum analysis, pattern analysis or out and out voice recognition. However, voice recognition is complex enough in implementation that it is not presently a preferred embodiment.

Ambient noise may be sampled at the base unit while threshold level is sampled at the headset microphone as another means of distinguishing voice from background. Or both may be sampled at either unit. Note that DSP, filtering, timing and so on may be carried out at either unit. In such alternative embodiments, the timing circuit and the voice level detection circuit may be present in the base unit, with the headset unit acting only to broadcast the sounds detected from the user's microphone.

Figure 6:
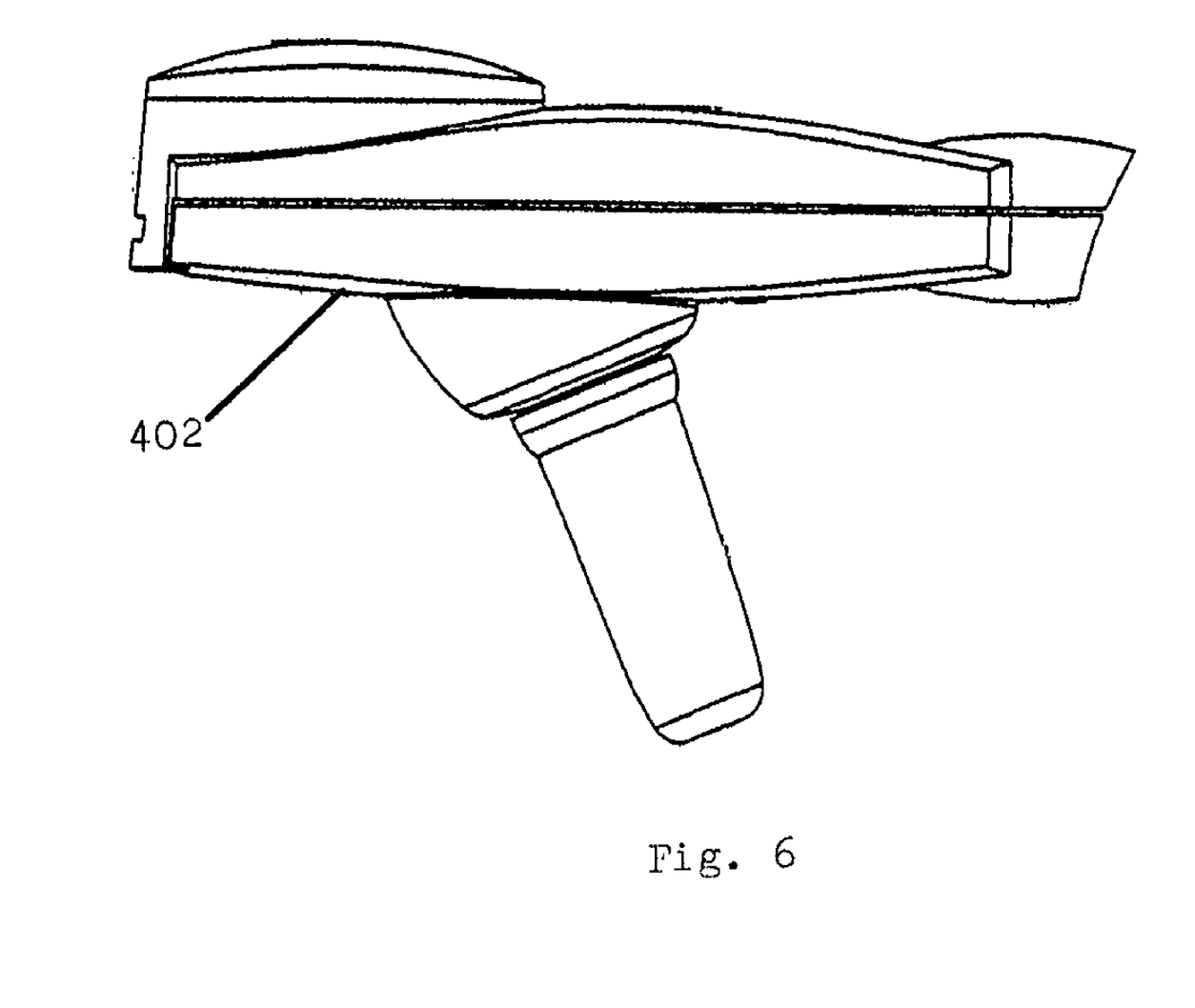
FIG. 6 is a side view of a wireless headset of the preferred embodiment of the invention.

FIG. 6 is a side view of a wireless headset 402 of the preferred embodiment of the invention. A microphone tube 18, of FIG. 1, extends towards the users mouth. The microphone tube 18 may be derived from plastic, poly carbon material, metal or ceramic with an ability to be manipulated or bent to the individual user's facial features. At an area approximate to the user's mouth a voice noise level of the user may be taken. A predetermined first and second voice decibel level may be determined by the noise level recognition circuit 332. Note that the microphone tube also provides an efficient method to distinguish voice from ambient noises: the location close to the mouth automatically receives a greater decibel level of sound energy than sources further away.

Figure 7:
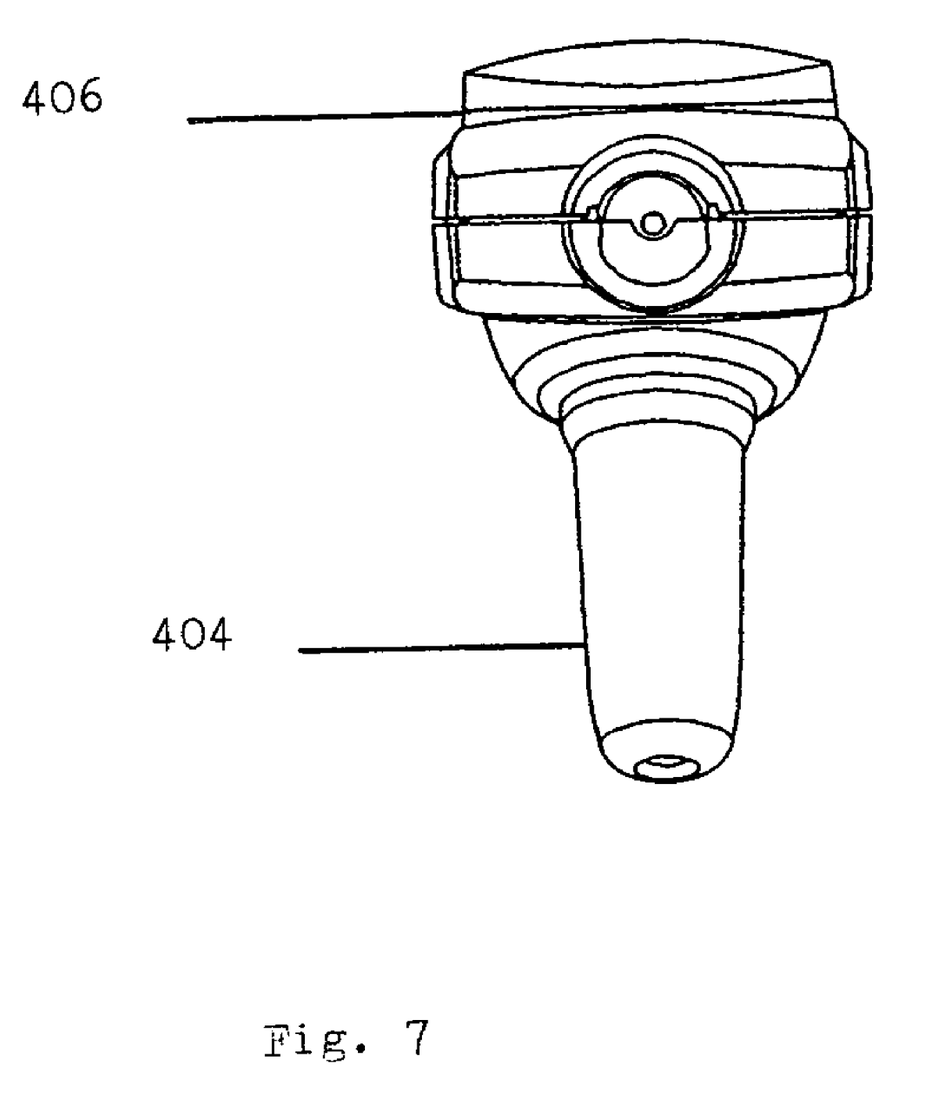
FIG. 7 is an end view of the wireless headset of the first embodiment shown in FIG. 6.
Figure 8:
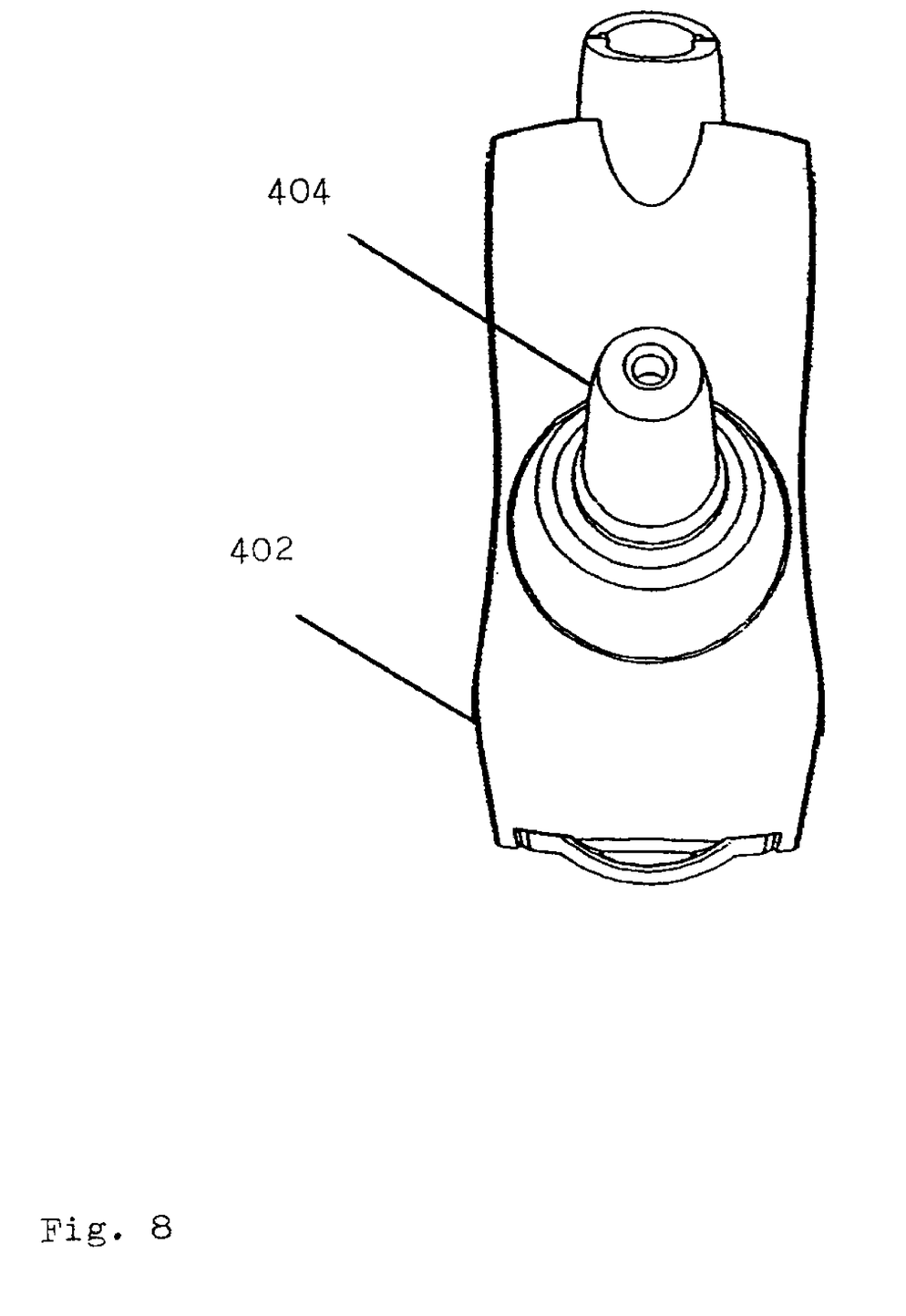
FIG. 8 is a bottom view of the wireless headset of the first embodiment shown in FIG. 6.
Figure 9:
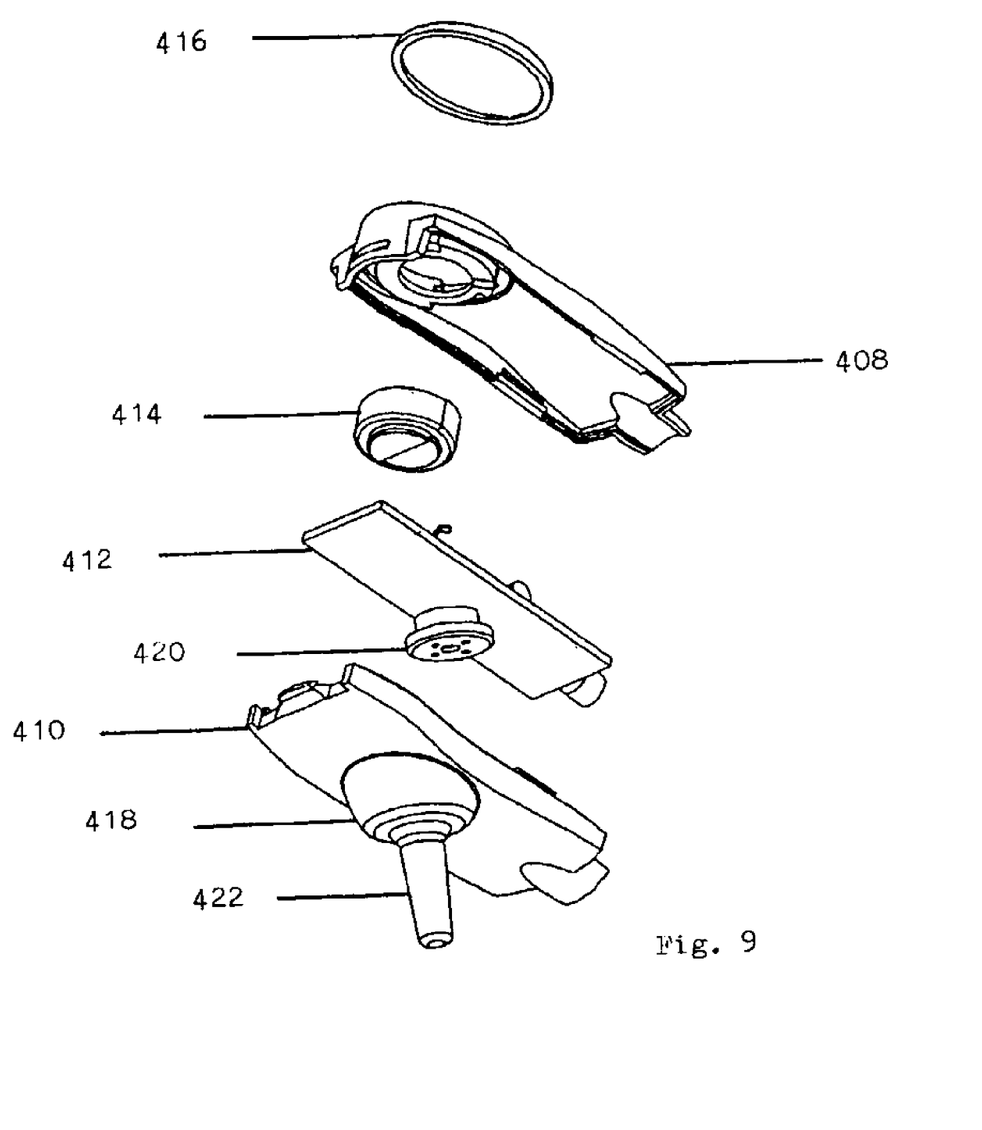
FIG. 9 is an exploded perspective view of the wireless headset of the first embodiment shown in FIG. 6.

FIG. 7 is an end view of the wireless headset of the first embodiment shown in FIG. 6. FIG. 8 is bottom view of the wireless headset of the first embodiment in FIG. 6. FIG. 9 is an exploded perspective view of the wireless headset of the first embodiment shown in FIG. 6. The ear canal is any and all of that small cavity leading from the outer ear to the inner. Friction between the wireless headset 2, retains headset body 14 of wireless headset 2 in place. In general, any such projection into the ear canal will be referred to herein as a sound tube: the sound tube configuration may vary a good deal in size, shape, from and substance; it may be entirely rigid, semi-rigid, it may be cylindrical, generally cylindrical, irregular, fitted to the ear or another shape. The sound tube will usually have therein either a speaker or an aperture, grill, mesh or other device to allow sound to pass from a mini-speaker in the sound tube or wireless headset body 14 to the ear canal of the user, and/or pass the other direction. The aperture in the sound tube is aligned with the aperture in the sound tube when the sound tube is disposed on the case of the unit.

The wireless headset of the preferred embodiment of the invention has an upper body 8, a lower body 10, and circuitry 12 disposed in between. Circuitry 12 comprises a printed circuit board with silicon electronic components thereon. Battery 14 provides electrical power, battery 14 may be changed by removing cap 16 (note that while battery 14 is below upper body 8 in FIG. 9, it may be above or co-elevation therewith, even in the preferred embodiment pictured).

The wireless headset may include either a receiver or a transceiver allowing both reception and transmission. In receiver embodiments, it may be utilized to carry an audio signal in a passive mode, for example a broadcast radio signal or a signal received from a broadcast unit which itself receives the audio signal from a source such as a television set or radio. In transceiver embodiments, the wireless headset may be used in conjunction with a cell phone or similar device to provide true hands free operation without a wire, a bulky headset having an ear clip or head band, and yet with increased comfort and sanitary benefits to the wearer.

Speaker housing 18 contains mini-speaker 20. One advantage of the method of the present invention is that min-speaker 20 may be sized, selected and arranged so as to minimize power drain upon battery 14. That is, use of sheath 4, the wireless headset of the present invention may be maintained in very close position to the ear drum of the user, thus minimizing drive current needed for mini-speaker 20. In addition, the configuration of speaker housing 18 includes sound tube 22, which actually projects into the ear canal of the wearer, directing sound precisely at the ear drum of the user and potentially bringing mini-speaker 20 closer even closer to the ear drum in alternative embodiments. Thus, a smaller speaker, smaller battery and smaller unit are permitted by the invention, thus furthering the convenience of the user. Mini-speaker 20 may be a peizo-electric device, a button speaker, or another type of speaker.

While frictional forces may be implicated in retaining the wireless headset in the ear of a user in the presently preferred embodiment, in other embodiments, the sound tube may be configured so that actual mechanical cooperation between the ear canal and the sound tube may serve the same purpose, that is, the convolutions of the ear canal may cooperate with the exterior sheath configuration.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

The invention claimed is:

1. A wireless headset for connection to a telephone comprising:
    a noise level recognition circuit operatively able to activate the headset;
    the noise level recognition circuit distinguishing voice levels below a first level decibel level as an ambient noise level;
    the noise level recognition circuit distinguishing voice levels above a second decibel level as the activating noise level; wherein
    the noise level recognition circuit initiating off-hook operation of such telephone if the activating noise level is detected during a 5 second period of time, following a first length of time used for detecting the ambient noise level.

2. The wireless headset of claim 1, further comprising a timer circuit, the timer circuit measuring the second length of time.

3. The wireless headset of claim 1, further comprising an adjustable decibel setting device for setting variable ambient noise levels.

4. The wireless headset of claim 1, further comprising an adjustable decibel setting device for setting activating noise levels.

5. The wireless headset of claim 1, further comprising a fuzzy logic circuit which samples the background noise level to determine the ambient noise level.

6. The wireless headset of claim 1, wherein the activating noise level must occur for 300 milliseconds in order allow the off hook initiation.

* * * * *